US012567363B2

(12) United States Patent
Wang et al.

(10) Patent No.: US 12,567,363 B2
(45) Date of Patent: Mar. 3, 2026

(54) PIXEL, DISPLAY DEVICE INCLUDING THE SAME, AND ELECTRONIC DEVICE

(71) Applicant: Samsung Display Co., Ltd., Yongin-Si (KR)

(72) Inventors: In Soo Wang, Yongin-si (KR); Hyeon Deuk Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/060,784

(22) Filed: Feb. 24, 2025

(65) Prior Publication Data

US 2026/0011288 A1 Jan. 8, 2026

(30) Foreign Application Priority Data

Jul. 3, 2024 (KR) ........................ 10-2024-0087530

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01); *G09G 2320/0233* (2013.01); *G09G 2330/028* (2013.01)

(58) Field of Classification Search
CPC ............. G09G 3/32; G09G 2310/0267; G09G 2310/0275; G09G 2310/08; G09G 2320/0233; G09G 2330/028
See application file for complete search history.

(56) References Cited

U.S. PATENT DOCUMENTS 9,209,204 B2 12/2015 Wang
10,417,967 B2 9/2019 Zhu et al.
10,504,435 B2 * 12/2019 Jeon ..................... G09G 3/3233
11,037,498 B2 * 6/2021 Seo ...................... G09G 3/3291
12,230,182 B2 * 2/2025 Wei ...................... G09G 3/3233
12,236,884 B2 * 2/2025 Cheng .................. G09G 3/3233
12,322,311 B2 * 6/2025 Park ..................... G09G 3/3233
2015/0123557 A1 * 5/2015 Lee ...................... G09G 3/3233 315/228
2017/0193896 A1 * 7/2017 Kim ....................... G09G 3/325
2020/0286417 A1 * 9/2020 Chae ........................ G09G 3/20
2020/0286448 A1 * 9/2020 Kim ......................... G09G 5/18
(Continued)

FOREIGN PATENT DOCUMENTS

KR 10-2015-0001154 A 1/2015
KR 10-2024-0035079 A 3/2024

*Primary Examiner* — Dmitriy Bolotin
(74) *Attorney, Agent, or Firm* — Innovation Counsel LLP

(57) ABSTRACT

A pixel is disclosed that includes a light emitting element, a pixel circuit, and a transistor. The light emitting element is electrically connected between a first node and a second power line. The pixel circuit is electrically connected between a second node and the first node, and includes a first transistor configured to control current flowing from the second node to the first node in response to a data signal. A transistor is electrically connected between a first power line and the first transistor, and includes a gate electrode electrically connected to the first power line. The transistor further includes a lower electrode disposed opposite the gate electrode with an active layer of the transistor interposed therebetween. The lower electrode is configured to receive a bias voltage.

20 Claims, 9 Drawing Sheets

(56) References Cited

U.S. PATENT DOCUMENTS

| | | | | |
|---|---|---|---|---|
| 2021/0366397 | A1* | 11/2021 | Na | G09G 3/3291 |
| 2022/0173189 | A1* | 6/2022 | Kim | G09G 3/325 |
| 2022/0215793 | A1* | 7/2022 | Han | G09G 3/3241 |
| 2022/0392382 | A1* | 12/2022 | Park | G09G 3/20 |
| 2023/0066949 | A1* | 3/2023 | Jeong | G09G 3/32 |
| 2023/0075599 | A1* | 3/2023 | Kim | H10K 59/126 |
| 2023/0231095 | A1* | 7/2023 | Choi | H10H 20/857<br>257/79 |
| 2023/0335044 | A1* | 10/2023 | An | G09G 3/3233 |
| 2024/0057411 | A1* | 2/2024 | An | H10K 59/88 |
| 2024/0062710 | A1* | 2/2024 | Park | G09G 3/3233 |
| 2024/0090278 | A1 | 3/2024 | Choi et al. | |
| 2024/0105104 | A1* | 3/2024 | Park | G09G 3/3266 |
| 2024/0161685 | A1* | 5/2024 | Park | H10K 59/131 |
| 2024/0169921 | A1* | 5/2024 | Lee | G09G 3/3233 |
| 2024/0242674 | A1* | 7/2024 | Yang | H10D 86/481 |
| 2024/0265850 | A1* | 8/2024 | Heo | G09G 3/3233 |
| 2024/0395199 | A1* | 11/2024 | Li | G09G 3/3233 |
| 2025/0061853 | A1* | 2/2025 | Ha | G09G 3/3233 |
| 2025/0174165 | A1* | 5/2025 | Park | G09G 3/3233 |
| 2025/0185369 | A1* | 6/2025 | Choi | H10D 86/60 |
| 2025/0252906 | A1* | 8/2025 | Yang | G09G 3/32 |
| 2025/0265999 | A1* | 8/2025 | Li | G09G 3/3233 |

* cited by examiner

PIXEL, DISPLAY DEVICE INCLUDING THE SAME, AND ELECTRONIC DEVICE

CROSS-REFERENCE TO RELATED APPLICATION

The present application claims priority to Korean patent application No. 10-2024-0087530 filed on Jul. 3, 2024, the entire disclosure of which is incorporated herein in its entirety by reference.

BACKGROUND

(a) Field of Invention

The present disclosure relates to a pixel, a display device including the pixel, and an electronic device.

(b) Description of Related Art

With the development of information technology, the importance of display devices as a medium connecting users and information has been emphasized. Owing to the importance of display devices, the use of various kinds of display devices, such as liquid crystal display devices and organic light emitting display devices, has increased.

SUMMARY

Embodiments of the present disclosure are directed to a pixel and a display device capable of reliably achieving desired luminance.

An embodiment of the present disclosure may provide a pixel including: a light emitting element electrically connected between a first node and a second power line; a pixel circuit electrically connected between a second node and the first node, and including a first transistor configured to control current flowing from the second node to the first node in response to a data signal; and a transistor electrically connected between a first power line and the first transistor, and including a gate electrode electrically connected to the first power line. The transistor may further include a lower electrode disposed opposite the gate electrode with an active layer of the transistor interposed therebetween. The lower electrode may be supplied with a bias voltage less than a power voltage applied to the first power line.

Each of the transistor and the first transistor may include an oxide semiconductor.

In an embodiment, a subthreshold swing representing a relationship between the data signal and the current may vary depending on the bias voltage.

As the bias voltage increases, a voltage range of the data signal for expressing a specific grayscale range may increase.

The first transistor may be electrically connected between the second node and a third node. A gate electrode of the first transistor may be electrically connected to a fourth node. The pixel circuit may further include: a second transistor electrically connected between the fourth node and a data line to which the data signal is applied; a capacitor electrically connected between the fourth node and the third node; a third transistor electrically connected between the third node and the first node; and a fourth transistor electrically connected between the first node and a third power line.

Each of the transistor and the first to fourth transistors may include an oxide semiconductor.

The second to fourth transistors include no lower electrode.

An embodiment of the present disclosure may provide a display device, including: a display panel including a pixel; a data driver configured to supply a data signal to the display panel; and a bias voltage generator configured to provide a bias voltage to the display panel. The pixel may include: a light emitting element electrically connected between a first node and a second power line; a pixel circuit electrically connected between a second node and the first node, and including a first transistor configured to control current flowing from the second node to the first node in response to the data signal; and a transistor electrically connected between a first power line and the first transistor, and including a gate electrode electrically connected to the first power line. The transistor may further include a lower electrode disposed opposite the gate electrode with an active layer of the transistor interposed therebetween. The lower electrode may be supplied with the bias voltage.

The bias voltage generator is disposed outside the display panel.

The bias voltage generator may include: an amplifier; a switching transistor electrically connected between a reference power line and a first input terminal of the amplifier; and a voltage divider configured to divide a voltage outputted through an output terminal of the amplifier and output the divided voltage through an output end of the bias voltage generator.

The voltage divider may include: a plurality of first resistors connected in series between the output terminal of the amplifier and the output end of the bias voltage generator; a plurality of switching transistors respectively connected in parallel to the first resistors; and a second resistor electrically connected between the output end of the bias voltage generator and a ground.

The first transistor may be electrically connected between the second node and a third node, and a gate electrode of the first transistor may be electrically connected to a fourth node. The pixel circuit may further include: a second transistor electrically connected between the fourth node and a data line to which the data signal is applied; a capacitor electrically connected between the fourth node and the third node; a third transistor electrically connected between the third node and the first node; and a fourth transistor electrically connected between the first node and a third power line.

The display device may further include: a timing controller configured to provide image data to the data driver; a scan driver configured to provide a second scan signal to the second transistor and provide a first scan signal to the fourth transistor; and an emission driver configured to provide an emission control signal to the third transistor. The timing controller may supply a switching control signal to the switching transistor.

The timing controller may periodically provide the switching control signal having a first voltage level.

In a first period, the emission driver may provide the emission control signal of a second voltage level. At a first time point in the first period, the timing controller may provide a switching control signal of a first voltage level. At a second time point in the first period, the scan driver may provide a first scan signal of a first voltage level. At a third time point in the first period, the scan driver may provide a second scan signal of a first voltage level.

The bias voltage generator may provide the bias voltage in common to all pixels in the display panel.

The bias voltage generator may sequentially provide the bias voltage according to a scanning order.

Each of the transistor and the first transistor may include an oxide semiconductor.

A subthreshold swing representing a relationship between the data signal and the current may vary depending on the bias voltage, and as the bias voltage increases, a voltage range of the data signal for expressing a specific grayscale range may increase.

An embodiment of the present disclosure may provide an electronic device, including: a display panel including a pixel; a driver configured to supply a data signal to the display panel based on input image data; a processor to provide input image data to the driver; and a bias voltage generator configured to provide a bias voltage to the display panel. The pixel may include: a light emitting element electrically connected between a first node and a second power line; a pixel circuit electrically connected between a second node and the first node, and including a first transistor configured to control current flowing from the second node to the first node in response to the data signal; and a transistor electrically connected between a first power line and the first transistor, and including a gate electrode electrically connected to the first power line. The transistor may further include a lower electrode disposed opposite the gate electrode with an active layer of the transistor interposed therebetween. The lower electrode may be supplied with the bias voltage.

Details of various embodiments are included in the detailed descriptions and drawings.

A pixel and a display device in accordance with embodiments of the present disclosure may include a transistor that is diode-connected between a first power line and a first transistor (or driving transistor). A bias voltage may be applied to a lower electrode of the transistor. Due to the bias voltage, subthreshold swing, which is a characteristic of the first transistor, may increase, and a voltage range of a data signal for expressing a specific luminance range (or grayscale range) may widen. Therefore, the desired luminance may be more reliably implemented.

The effects of the present disclosure are not limited by the foregoing, and other various effects are anticipated herein.

DETAILED DESCRIPTION

Figure 1:
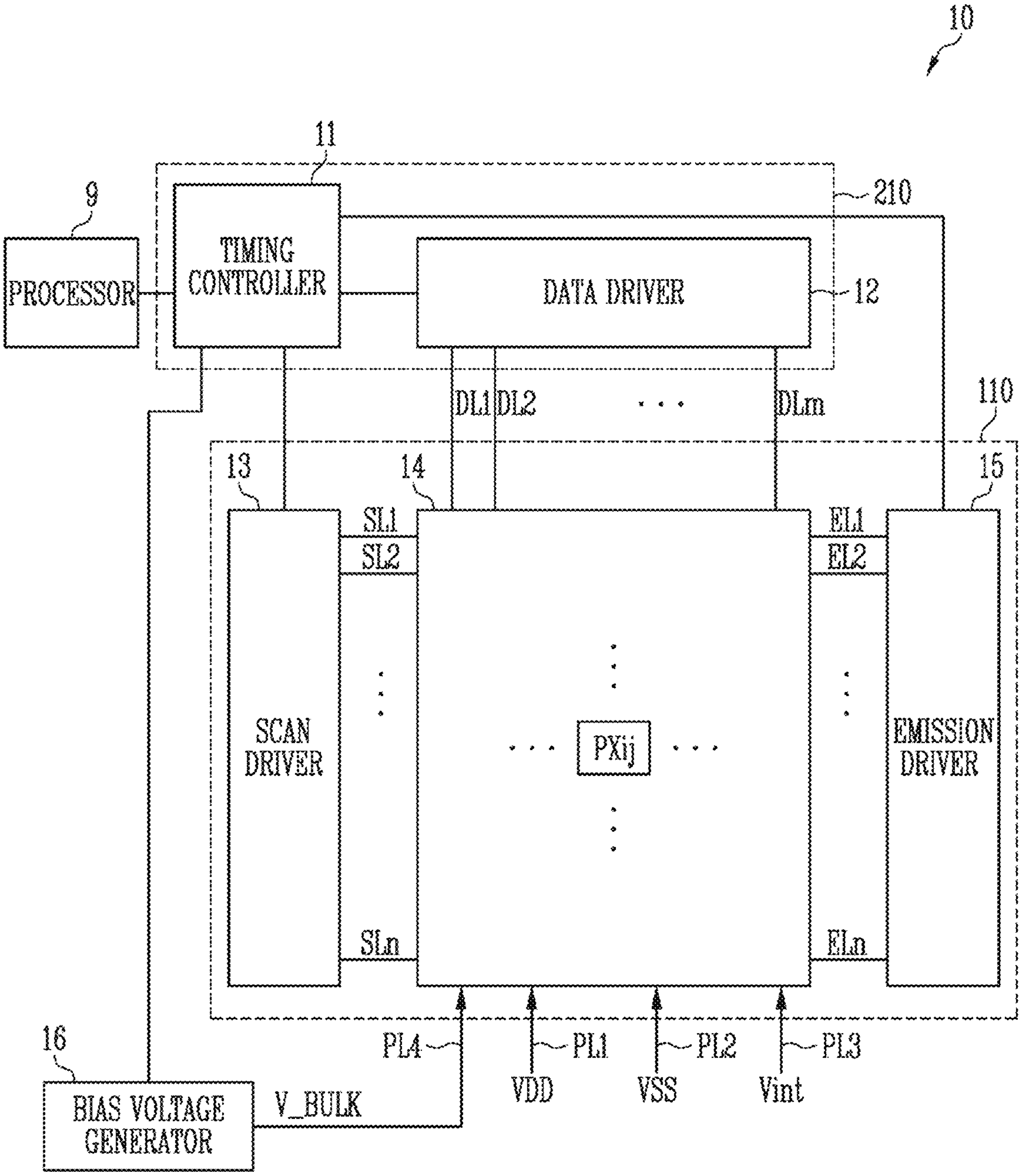
FIG. 1 is a diagram illustrating a display device in accordance with embodiments.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units or modules. Those skilled in the art will understand that such blocks, units, or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, or modules implemented by a microprocessor or other similar hardware, they may be programmed and controlled using software to perform various functions discussed herein, and may be optionally driven by firmware or software. In addition, each block, unit, or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units or modules may be physically separated into two or more individual blocks, units or modules which interact with each other without departing from the scope of the inventive concept. In some embodiments, blocks, units or modules may be physically combined into more complex blocks, units or modules without departing from the scope of the inventive concept.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

The present disclosure is not limited to the following embodiments and may be modified into various forms. Each embodiment to be described below may be implemented alone, or combined with at least another embodiment to make various combinations of embodiments.

FIG. 1 is a diagram illustrating a display device 10 in accordance with embodiments.

Referring to FIG. 1, the display device 10 may include a display driver 210 and a display component (or a display panel) 110.

The display driver 210 may control the display component 110. The display driver 210 may include a timing controller 11 and a data driver 12. The display driver 210 may be formed of a single integrated circuit (IC), or may be formed of a plurality of ICs. The display component 110 may display a certain image. The display component 110 may include a scan driver 13 and a pixel component 14. In an embodiment, the display component 110 may further include an emission driver 15. The scan driver 13 and the emission driver 15 may be formed in the display component 110 together with pixels.

The timing controller 11 may receive data and control signals corresponding to each frame from a processor 9. The processor 9 may correspond to a graphics processing unit (GPU), a central processing unit (CPU), an application processor (AP), or the like. The control signals may include a vertical synchronization signal, a horizontal synchronization signal, a data enable signal, and the like. Each cycle of the vertical synchronization signal may correspond to each frame period. Each cycle of the horizontal synchronization signal may correspond to a horizontal period. The data may be supplied on a horizontal line basis in response to a pulse of an enable level of a data enable signal during each horizontal period. The horizontal line may refer to pixels (e.g., a pixel row) connected to the same scan line.

The timing controller 11 may render the data in consideration of the specifications of the display device 10. The timing controller 11 may correct the data to enable the display component 14 to display an image with uniform luminance. The data rendered or corrected by the timing controller 11 may be provided to the data driver 12. Furthermore, the timing controller 11 may provide a data control signal to the data driver 12. In addition, the timing controller 11 may provide a scan control signal to the scan driver 13.

The data driver 12 may generate, using the data and data control signals that are received from the timing controller 11, data signals (or data voltages) to be provided to data lines DL1, DL2, . . . , and DLm. Here, m is a positive integer.

The scan driver 13 may use scan control signals (e.g., a clock signal, a scan start signal, etc.) received from the timing controller 11 to generate enable scan signals (or scan signals) to be provided to the scan lines SL1, SL2, . . . , and SLn. Here, n is a positive integer. The enable scan signals may be set to gate-on voltages. For example, in the case where a scan signal is supplied to an N-type transistor, the enable scan signal may be set to a high voltage (or a first voltage level). For example, in the case where a scan signal is supplied to a P-type transistor, the enable scan signal may be set to a low voltage (or a second voltage level).

The scan driver 13 may sequentially supply enable scan signals to the scan lines SL1 to SLn. The scan driver 13 may include scan stages configured in the form of a shift register. The scan driver 13 may generate enable scan signals in such a way as to sequentially transmit a scan start signal in the form of a turn-on level pulse to a subsequent scan stage under the control of a clock signal.

The emission driver 15 may receive an emission driving signal (e.g., a clock signal, an emission start signal, etc.) from the timing controller 11. The emission driver 15 may generate disable emission control signals to be provided to the emission control lines EL1, EL2, . . . , ELn, in response to the emission driving signal. The disable emission control signals may be set to gate-off voltages. For example, in the case where an emission control signal is set to an N-type transistor, the disable emission control signal may be set to a low voltage. For example, in the case where an emission control signal is set to a P-type transistor, the disable emission control signal may be set to a high voltage.

The emission driver 15 may sequentially supply disable emission control signals to the emission control lines EL1 to ELn. The emission driver 15 may include emission stages configured in the form of a shift register. The emission driver 13 may generate disable emission signals in such a way as to sequentially transmit an emission start signal in the form of a pulse of a turn-off level to a subsequent emission stage under the control of a clock signal.

The pixel component 14 includes pixels. Each of the pixels may be connected to a corresponding scan line, a corresponding emission control line, and a corresponding data line. For example, an ij-th pixel PXij (hereinafter, referred to as “pixel”) may be connected to an i-th scan line, an i-th emission control line, and an j-th data line. The pixels may include pixels configured to emit a first color of light, pixels configured to emit a second color of light, and pixels configured to emit a third color of light. The first color, the second color, and the third color may be different colors. For example, the first color may be one of red, green, and blue. The second color may be one of red, green, and blue, other than the first color. The third color may be a remaining color among the red, green, and blue, other than the first color and the second color. Furthermore, magenta, cyan, and yellow, in lieu of red, green, and blue, may be used as the first to third colors.

The pixel component 14 may be connected to a first power line PL1 and a second power line PL2. The first power line PL1 may be supplied with first driving power VDD (or first power voltage) from a power supply, which is not shown. The second power line PL2 may be supplied with second driving power VSS (or second power voltage) from the power supply. The first driving power VDD may be provided to supply driving current to the pixels. The second driving power VSS may be provided to receive the driving current from the pixels. During a period in which the pixels are set to an emission state, the first driving power VDD may be set to a voltage higher than that of the second driving power VSS.

The first power line PL1 and the second power line PL2 may be connected in common to the pixels, but embodiments of the present disclosure are not limited thereto. In an embodiment, the first power line PL1 may be configured of a plurality of power lines. The power lines may be connected to different pixels. In an embodiment, the second power line PL2 may be configured of a plurality of power lines. The power lines may be connected to different pixels. In other words, in an embodiment of the present disclosure, the pixels may be connected to any one of the first power lines PL1, and any one of the second power lines PL2.

The pixel component 14 may be further connected to a third power line PL3. The third power line PL3 may be supplied with initialization power Vint. The voltage of the initialization power Vint may be set to turn off the light emitting element LD when supplied to a first electrode of the light emitting element of the pixel PXij. The third power line PL3 may be connected in common to the pixels, but embodiments of the present disclosure are not limited thereto. In an embodiment, the third power line PL3 may be configured of a plurality of power lines. The power lines may be connected to different pixels.

In embodiments, the display device 10 may further include a bias voltage generator 16 (or a bias voltage supply). The bias voltage generator 16 may be disposed outside the display component 110. For example, the bias voltage generator 16 may be disposed on a printed circuit board together with the timing controller 11, but the present disclosure is not limited thereto.

The bias voltage generator 16 may receive a switching control signal from the timing controller 11. The bias voltage generator 16 may generate a bias voltage V_BULK to be provided to a fourth power line PL4 in response to the switching control signal. The bias voltage V_BULK may be set to a voltage lower the first driving power VDD. For example, the bias voltage V_BULK may range from approximately 1 V to approximately 2 V, but is not limited thereto.

Detailed configuration of the bias voltage generator 16 will be described below with reference to FIG. 6. The fourth power line PL4 may be connected in common to the pixels, but embodiments of the present disclosure are not limited thereto. In an embodiment, the fourth power line PL4 may be configured of a plurality of power lines. The power lines may be connected to different pixels. For example, the power lines may be arranged on a horizontal line basis (or a pixel row basis). In this case, the bias voltage generator 16 may sequentially provide bias voltages V_BULK to the power lines according to a scanning order, in a manner similar to that of the scan driver 13.

Figure 2:
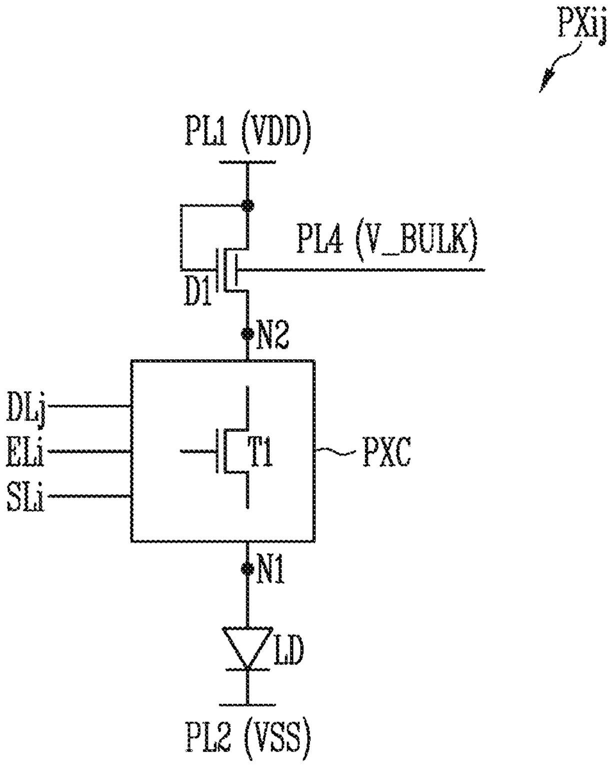
FIG. 2 is a diagram illustrating an embodiment of a pixel included in the display device of FIG. 1.

FIG. 2 is a diagram illustrating an embodiment of the pixel PXij included in the display device 10 of FIG. 1.

Referring to FIG. 2, the pixel PXij may be connected to corresponding signal lines DLj, ELi, and SLi. For example, the pixel PXij may be connected to a j-th data line DLj (hereinafter, referred to as "data line"), an i-th emission control line ELi (hereinafter, referred to as "emission control line"), and an i-th scan line SLi (hereinafter, referred to as "scan line"). In an embodiment, the pixel PXij may be also connected to the first power line PL1, the second power line PL2, and the fourth power line PL4.

The pixel PXij may include a light emitting element LD, and a pixel circuit PXC configured to control the amount of current to be supplied to the light emitting element LD. Furthermore, the pixel PXij may further include a first diode (or a diode) D1 configured to adjust current-voltage characteristics of the pixel circuit PXC. Although the diode D1 is illustrated separately from the pixel circuit PXC for the sake of explanation, the first diode D1 may be included in the pixel circuit PXC.

The light emitting element LD may be connected between a first node N1 and the second power line PL2. Here, the term "connected" implies being electrically linked or joined. The first electrode (or anode electrode) of the light emitting element LD may be connected to the first power line PL1 via the pixel circuit PXC and the first diode D1. A second electrode (or cathode electrode) of the light emitting element LD may be connected to the second power line PL2. The light emitting element LD may generate light of a certain luminance corresponding to the amount of current that is supplied from the first power line PL1 to the second power line PL2 via the first diode D1 and the pixel circuit PXC.

An organic light emitting diode may be selected as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 2 illustrates that the pixel PXij includes a single light emitting element LD, the pixel PXij in an embodiment may include a plurality of light emitting elements LD. The plurality of light emitting elements LD may be connected in series, parallel, or series-parallel to each other.

The pixel circuit PXC may be connected between a second node N2 and the first node N1. The pixel circuit PXC may include a first transistor T1 (or a driving transistor). The first transistor T1 may control current (or the amount of current) flowing from the second node N2 to the first node N1 in response to a data signal provided through the data line DLj. For example, the first transistor T1 may include an oxide semiconductor. For example, the first transistor T1 may be formed as an N-type transistor.

The first diode D1 may be connected between the first power line PL1 and the pixel circuit PXC (or the first transistor T1). The first diode D1 may be implemented as a transistor, and a gate electrode of the first diode D1 may be connected to the first power line PL1. In other words, the first diode D1 may be a diode-connected transistor. For example, the first diode D1 may include an oxide semiconductor. For example, the first diode D1 may be formed as an N-type transistor.

Furthermore, the first diode D1 may further include a lower electrode disposed opposite the gate electrode with an active layer interposed therebetween. The lower electrode may be connected to the fourth power line PL4, and a bias voltage V_BULK may be applied to the lower electrode. In other words, a back bias may be applied to the first diode D1.

The first diode D1 may adjust characteristics of the pixel circuit PXC (or characteristics of the first transistor T1, e.g., current-voltage characteristics). For example, a resistance component of the first diode D1 may vary due to the bias voltage V_BULK applied to the lower electrode of the first diode D1. The current-voltage characteristics of the first transistor T1 may vary due to the resistance component. For instance, in the case where the resistance component of the first diode D1 is relatively large, variations in current with respect to changes in threshold voltage of the first transistor T1 may be reduced.

Figure 3:
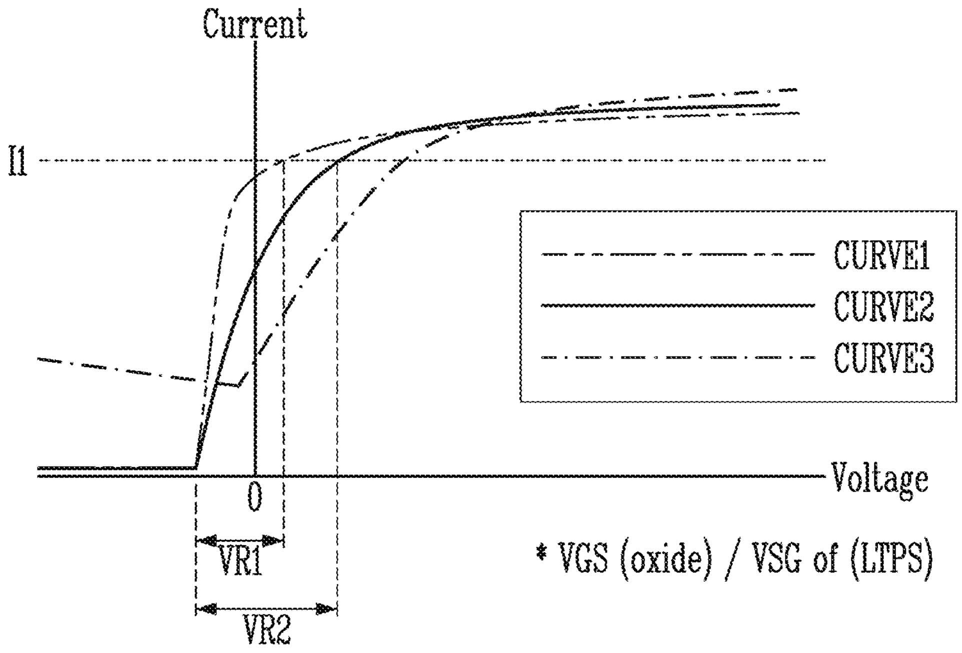
FIG. 3 is a diagram illustrating current-voltage characteristics of a first transistor included in the pixel of FIG. 2.

FIG. 3 is a diagram illustrating current-voltage characteristics of the first transistor included in the pixel PXij of FIG. 2.

Referring to FIG. 3, a second curve CURVE2 illustrates current (or drain-source current, i.e., current flowing through the first transistor T1) as a function of a gate source voltage VGS (i.e., a voltage between the gate electrode and the source electrode) of the first transistor of the pixel PXij in FIG. 2. A first curve CURVE1 illustrates current-voltage characteristics in accordance with a first comparative example. In detail, the first curve CURVE1 illustrates current as a function of a gate source voltage VGS of a transistor (hereinafter, referred to as "oxide transistor") including an oxide semiconductor. For example, the first curve CURVE1 illustrates the current-voltage characteristics of the oxide transistor in a pixel that does not include the first diode D1 of FIG. 2. A third curve CURVE3 illustrates current-voltage characteristics in accordance with a second comparative example. In detail, the third curve CURVE3 illustrates current as a function of a source gate voltage VSG of a transistor (hereinafter, referred to as "silicon transistor") including a silicon semiconductor (e.g., LTPS).

If the gate source voltage VGS or the source gate voltage VSG is less than or equal to a threshold voltage, the current may increase linearly with an increase of the gate source voltage VGS or the source gate voltage VSG, respectively. A voltage required for the current to increase by 10 times in the aforementioned region (or linear region) is referred to as a subthreshold swing. The subthreshold swing may be obtained as a reciprocal of a slope of the curve representing the current-voltage characteristics. The subthreshold swing may correspond to a relationship between the current and the data signal provided through the data line DLj in FIG. 2.

Referring to the first curve CURVE1 and the third CURVE3, the subthreshold swing of the oxide transistor may be less than the subthreshold swing of the silicon transistor. In the case where a maximum grayscale value is represented by maximum current I1, a voltage range (or data swing range, or data range) of the data signal provided to the pixel to represent a specific grayscale value (or specific luminance) using the oxide transistor may correspond to a first voltage range VR1. The voltage range of the data signal for the oxide transistor may be less than the voltage range of the data signal for the silicon transistor. Accordingly, it may be difficult to accurately express grayscale using the oxide transistor, or additional costs (e.g., configuration to divide the voltage range more finely) may be required to achieve accurate grayscale expression.

Referring to the second curve CURVE2, in the case where the first diode D1 of FIG. 2 is added, current variation for the same voltage may decrease due to the resistance component of the first diode D1, and subthreshold swing may increase. The voltage range of the data signal provided to the pixel PXij of FIG. 2 may correspond to a second voltage range VR2. The second voltage range VR2 may be set greater than the first voltage range VR1. In other words, the voltage range may be increased by the first diode D1, thereby allowing the pixel PXij of FIG. 2 to reliably express or achieve the desired luminance.

In an embodiment, depending on the bias voltage V_BULK (refer to FIG. 2), the subthreshold swing of the first transistor T1 may vary, and the voltage range of the data signal for expressing a specific grayscale range may vary. For example, as the magnitude of the bias voltage V_BULK increases, the subthreshold swing may increase, and the voltage range of the data signal for expressing the specific grayscale range may increase. Depending on the specifications of the display device (e.g., power consumption, a grayscale range, etc.), the required voltage range may vary. The bias voltage V_BULK may be set in various ways taking the required voltage range into account.

As described above, due to the bias voltage V_BULK applied to the lower electrode of the first diode D1, the subthreshold swing of the first transistor (or driving transistor) T1 may increase, and the voltage range of the data signal for expressing the specific luminance range (or grayscale range) may widen. Therefore, the desired luminance may be more reliably implemented.

Figure 4A:
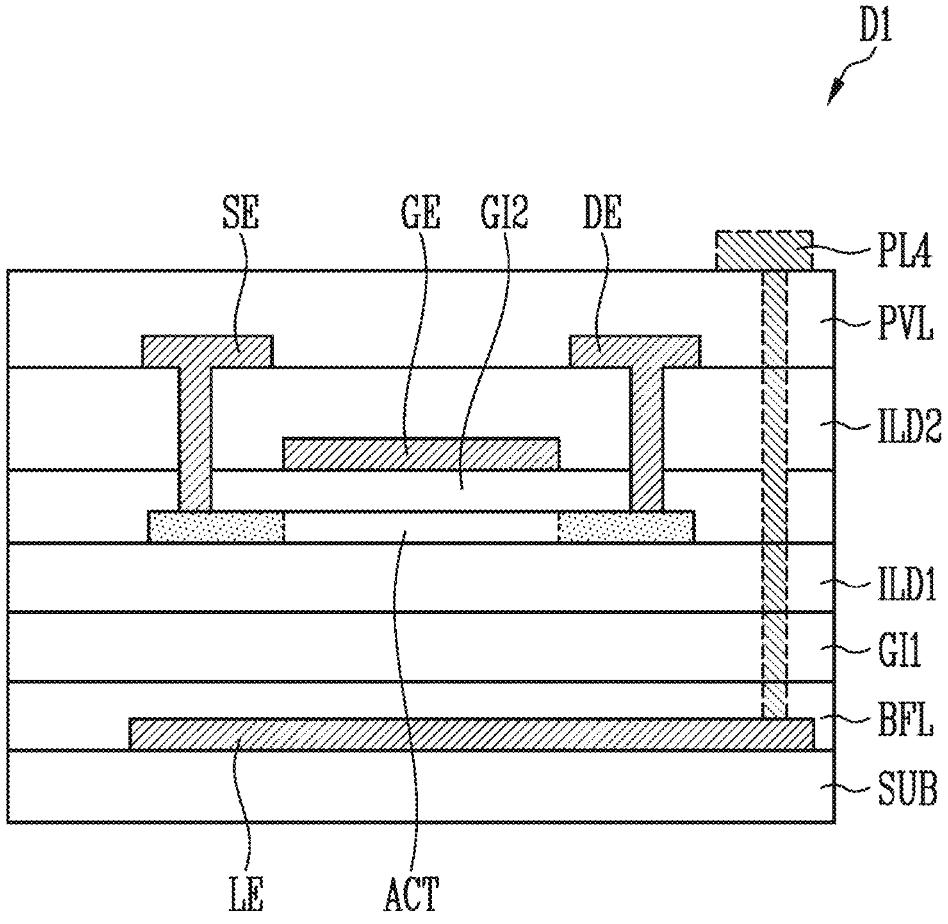
FIGS. 4A and 4B are sectional views illustrating an embodiment of a first diode included in the pixel of FIG. 2.
Figure 4B:
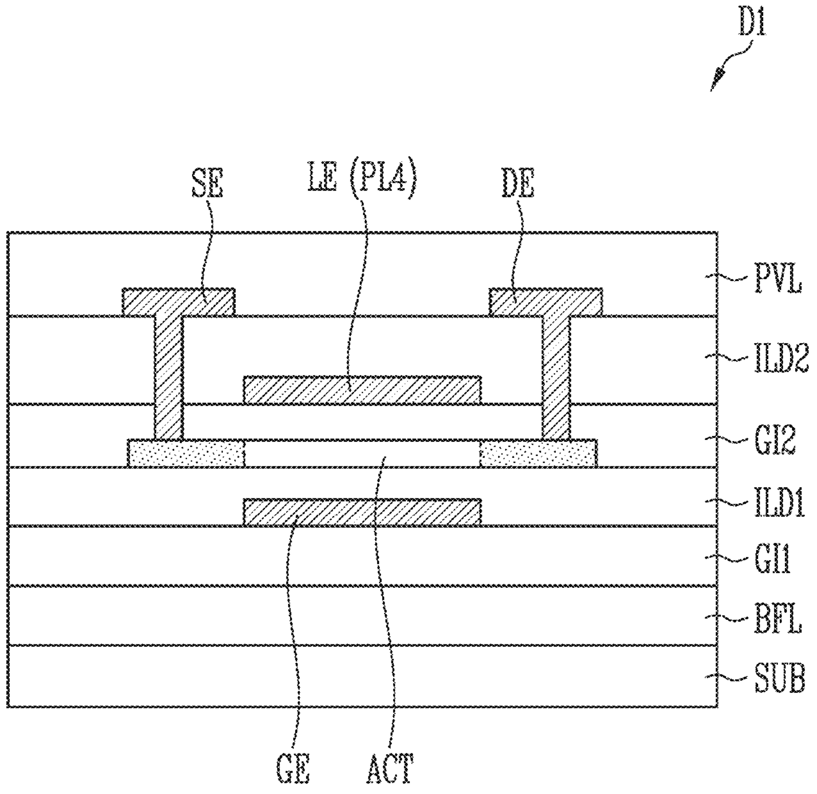

FIGS. 4A and 4B are sectional views illustrating an embodiment of the first diode D1 included in the pixel PXij of FIG. 2.

Referring to FIG. 4A, the substrate SUB may include transparent insulating material, thus allowing light to pass therethrough. The substrate SUB may be a rigid substrate or a flexible substrate.

Insulating layers BFL, GI1, ILD1, GI2, ILD2, and PVL may be sequentially stacked on the substrate SUB.

A buffer layer BFL may be disposed on a surface of the substrate SUB. The buffer layer BFL may prevent impurities from being diffused into the first diode (or transistor) D1. The buffer layer BFL may be an inorganic layer including inorganic material (or substance). The buffer layer BFL may include at least one of silicon nitride ($SiN_x$), silicon oxide ($SiO_x$), silicon oxynitride ($SiO_xN_y$), and aluminum oxide ($AlO_x$). The buffer layer BFL may be provided in the form of a single layer structure, or provided in the form of a multilayer structure having at least two or more layers. The buffer layer BFL may be omitted depending on the material of the substrate SUB or processing conditions.

A first gate insulating layer GI1 may be disposed on the buffer layer BFL. The first gate insulating layer GI1 may include the same material as that of the buffer layer BFL, or may include a suitable (or selected) material among the materials exemplified as the constituent materials of the buffer layer BFL. For example, the first gate insulating layer GI1 may be an inorganic layer including inorganic material.

A first interlayer insulating layer ILD1 may be disposed on a surface of the first gate insulating layer GI1. The first interlayer insulating layer ILD1 may be an inorganic layer including inorganic material or an organic layer including organic material.

A second gate insulating layer GI2 may be disposed on the first interlayer insulating layer ILD1. The second gate insulating layer GI2 may include the same material as that of the first gate insulating layer GI1, or may include one or more suitable (or selected) materials among materials exemplified as the constituent materials of the first gate insulating layer GI1.

A second interlayer insulating layer ILD2 may be disposed on the second gate insulating layer GI2. The second interlayer insulating layer ILD2 may include the same material as that of the first interlayer insulating layer ILD1, or may include one or more suitable (or selected) materials among materials exemplified as the constituent materials of the first interlayer insulating layer ILD1.

A passivation layer PVL may be disposed on a surface of the second interlayer insulating layer ILD2. The passivation layer PVL may be an inorganic layer including inorganic material or an organic layer including organic material.

The first diode D1 may include a semiconductor pattern (or active layer) ACT, a gate electrode GE, a source electrode SE, a drain electrode DE, and a lower electrode LE.

The semiconductor pattern ACT may be disposed on the first interlayer insulating layer ILD1. The semiconductor pattern ACT may include an oxide semiconductor, but is not limited thereto. The semiconductor pattern ACT may include a channel area, a first contact area that contacts a first end of the channel area, and a second contact area that contacts a second end of the channel area. The first contact area may be a source area, and the second contact area may be a drain area. The second gate insulating layer GI2 may be disposed on the semiconductor pattern ACT.

The gate electrode GE may be disposed on the second gate insulating layer GI2. The gate electrode GE may be formed of a single-layer structure or a multilayer structure made of molybdenum (Mo), copper (Cu), chrome (Cr), gold (Au), silver (Ag), titanium (Ti), nickel (Ni), neodymium (Nd), indium (In), tin (Sn), and an oxide or alloy thereof. The gate electrode GE may overlap an area of the semiconductor pattern ACT. The area of the semiconductor pattern ACT that overlaps the gate electrode GE may be the channel area of the first diode D1. The second interlayer insulating layer ILD2 may be disposed on the gate electrode GE.

The source electrode SE and the drain electrode DE may be disposed on the second interlayer insulating layer ILD2. Each of the source electrode SE and the drain electrode DE may be formed of a single layer or multiple layers made of molybdenum (Mo), copper (Cu), aluminum (Al), chrome (Cr), gold (Au), silver (Ag), titanium (Ti), nickel (Ni), neodymium (Nd), indium (In), tin (Sn), and an oxide or alloy thereof.

The source electrode SE may be connected to the first contact area of the semiconductor pattern ACT through a contact hole passing through the second gate insulating layer GI2 and the second interlayer insulating layer ILD2. The drain electrode DE may be connected to the second contact area of the semiconductor pattern ACT through a contact hole passing through the second gate insulating and the second interlayer insulating layer ILD2.

The lower electrode (or lower metal pattern) LE may be disposed on the substrate SUB. The lower electrode LE may overlap the first diode D1 (or the semiconductor pattern ACT). The lower electrode LE may be disposed to face the gate electrode GE with the semiconductor pattern ACT interposed therebetween. The lower electrode LE may be connected to the fourth power line PL4. The fourth power line PL4 disposed on the passivation layer PVL may be connected to the lower electrode LE through a contact hole passing through the insulating layers BFL, GI1, ILD1, GI2, ILD2, and PVL. Although the fourth power line PL4 has been described as being disposed on the passivation layer PVL, the disposition of the fourth power line PL4 is not particularly limited. For example, the fourth power line PL4 may be disposed between the insulating layers BFL, GI1, ILD1, GI2, ILD2, and PVL.

Although the first diode D1 has been described as having a top gate structure with reference to FIG. 4A, the present disclosure is not limited thereto. For example, as illustrated in FIG. 4B, the first diode D1 may have a bottom gate structure. In this case, the gate electrode GE may be disposed under the semiconductor pattern ACT, and the lower electrode LE (and the fourth power line PL4) may be disposed over the semiconductor pattern ACT.

Figure 5:
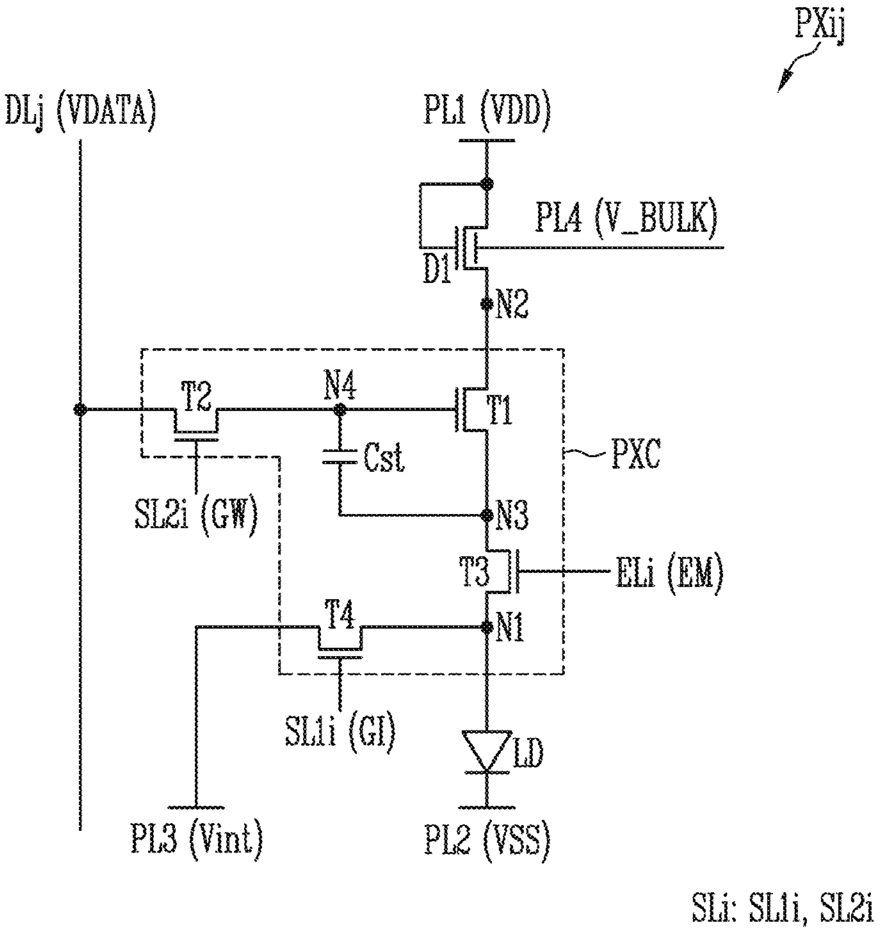
FIG. 5 is a diagram illustrating an embodiment of the pixel of FIG. 2.

FIG. 5 is a diagram illustrating an embodiment of the pixel PXij of FIG. 2.

Referring to FIGS. 2 and 5, the pixel circuit PXC may further include a second transistor T2, a third transistor T3, a fourth transistor T4, and a storage capacitor Cst (or a capacitor). Each of the second transistor T2, the third transistor T3, and the fourth transistor T4 may include an oxide transistor, and may be formed as an N-type transistor. Each of the second transistor T2, the third transistor T3, and the fourth transistor T4 may not include a lower electrode.

The first transistor T1 may be connected between the second node N2 and a third node N3. The gate electrode of the first transistor T1 may be connected to a fourth node N4. The first transistor T1 may control, in response to a voltage of the fourth node N4, the amount of current flowing from the first driving power VDD to the second driving power VSS via the light emitting element LD.

The second transistor T2 may be connected between the data line DLj and the fourth node N4. A gate electrode of the second transistor T2 may be connected to a 2i-th scan line SL2*i* (or a second scan line). The 2i-th scan line SL2*i* and a 1i-th scan line SL1*i* may be included in the scan line SLi of FIG. 2. When a second enable scan signal GW (or a second scan signal) is supplied to the 2i-th scan line SL2*i*, the second transistor T2 may be turned on to connect the data line DLj to the fourth node N4.

The third transistor T3 may be connected between the third node N3 and the first node N1. A gate electrode of the third transistor T3 may be connected to the emission control line ELi. When an emission control signal EM having a high voltage is supplied to the emission control line ELi, the third transistor T3 may be turned on to connect the third node N3 to the first node N1. When an emission control signal EM (or a disable emission control signal) having a low voltage is supplied to the emission control line ELi, the third transistor T3 may be turned off to electrically separate the third node N3 from the first node N1.

The fourth transistor T4 may be connected between the first node N1 and the third power line PL3. A gate electrode of the fourth transistor T4 may be connected to the 1i-th scan line SL1*i*. When a first enable scan signal GI (or a first scan signal) is supplied to the second scan line SL2*i*, the fourth transistor T4 may be turned on to supply the voltage of the initialization power Vint from the third power line PL3 to the first node N1 (or the first electrode of the light emitting element LD).

The storage capacitor Cst may be formed or connected between the fourth node N4 and the third node N3. The storage capacitor Cst may store the voltage of the fourth node N4.

The pixel PXij may include the five transistors T1, T2, T3, T4, and D1, and the single capacitor Cst. In this case, the pixel PXij may be designed to minimize a surface area required for the transistors, and thus may be applied to high-resolution panels.

Figure 6:
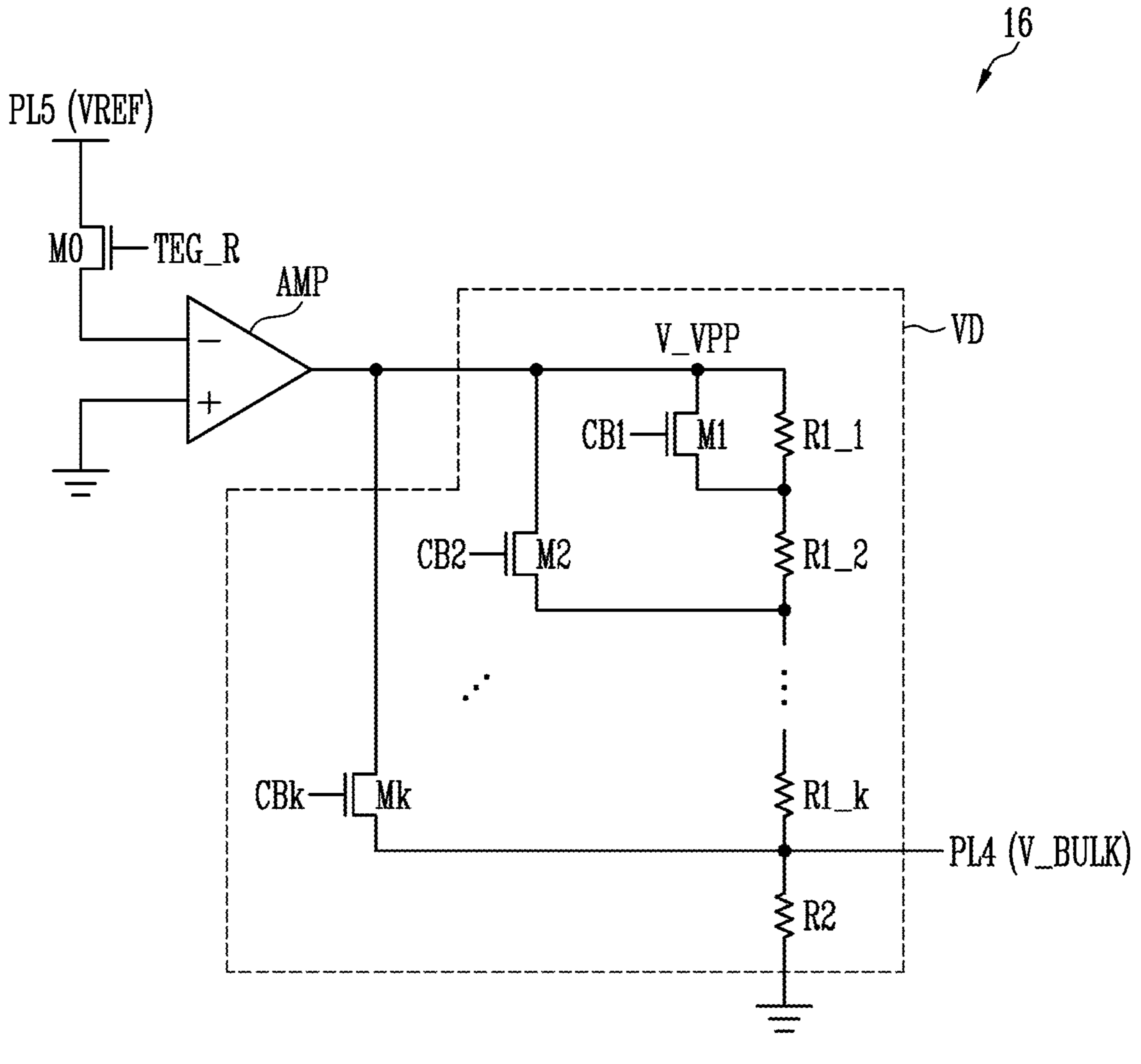
FIG. 6 is a diagram illustrating an embodiment of a bias voltage generator included in the display device of FIG. 1.

FIG. 6 is a diagram illustrating an embodiment of a bias voltage generator 16 included in the display device of FIG. 1.

Referring to FIG. 6, the bias voltage generator 16 may include a switching transistor M0, an amplifier AMP, and a voltage divider VD.

The switching transistor M0 may be connected to a fifth power line PL5 (or a reference power line) and a first input terminal (e.g., a "−" terminal) of the amplifier AMP. Reference power VREF (or a reference voltage) may be applied to the fifth power line PL5. A switching control signal TEG_R may be applied to a gate electrode of the switching transistor M0. The switching control signal TEG_R may be provided from the timing controller 11 (refer to FIG. 1). The switching transistor M0, when a switching control signal TEG_R set to a gate-one voltage is supplied thereto, may be turned on to connect the fifth power line PL5 to the first input terminal of the amplifier AMP.

A second input terminal (e.g., a "+" terminal) of the amplifier AMP may be connected to the ground.

The voltage divider VD may divide a voltage V_VPP (hereinafter, referred to as "output voltage") outputted through an output terminal of the amplifier AMP, and then output the divided voltage through an output end of the bias voltage generator 16.

In an embodiment, the voltage divider VD may include first resistors R1_1, R1_2, . . . , and R1_k, switching transistors M1, M2, . . . , and Mk, and a second resistor R2. Here, k is a positive integer.

The first resistors R1_1 to R1_k may be connected in series between the output terminal of the amplifier AMP and the output end of the bias voltage generator 16.

The second resistance R2 may be connected between the output end of the bias voltage generator 16 and the ground.

The switching transistors M1, M2, . . . , and Mk may be respectively connected in parallel to the first resistors R1_1 to R1_k. For example, the first switching transistor M1 is connected in parallel to the 1_1-th resistor R1_1, and may be turned on in response to a first bias control signal CB1. The second switching transistor M2 is connected in parallel to the 1_2-th resistor R1_2 (and the 1_1-th resistor R1_1), and may be turned on in response to a second bias control signal CB2. The k-th switching transistor Mk is connected in parallel to the 1_k-th resistor R1_k (and the 1_1-th resistor R1_1, and the 1_2-th resistor R1_2), and may be turned on in response to a k-th bias control signal CBk.

The bias voltage V_BULK may be determined according to the following equation 1.

$$VBULK = \text{V\_VPP} \times \frac{R2}{(R1 + R2)} \quad \text{[Equation 1]}$$

Here, VBULK may denote a bias voltage V_BULK, V_VPP may denote an output voltage V_VPP of the amplifier AMP, R2 may denote a resistance value of the second resistor R2, and R1 may denote a total resistance of the first resistors R1_1 to R1_k corresponding to the bias control signals CB1 to CBk. Voltage levels of the bias control signals CB1 to CBk may be preset during a process of fabricating the display device.

For example, in the case where only the k-th switching transistor Mk is turned on, the bias voltage V_BULK may be the same as the output voltage V_VPP (i.e., VBULK=V_VPP*R2/R2). For example, each of the output voltage V_VPP and the bias voltage V_BULK may be 2 V. For instance, in the case where only the second switching transistor M2 or the first switching transistor M1 is turned on, the bias voltage V_BULK may be set to be less than the output voltage V_VPP {i.e., VBULK=V_VPP*R2/(R1_k+R2) or VBULK=V_VPP*R2/(R1_2+R1_k+R2)}. For example, the bias voltage V_BULK may be approximately 1.5 V or approximately 1 V. In other words, the bias voltage V_BULK may have a voltage level less than or equal to that of the output voltage V_VPP.

Figure 7:
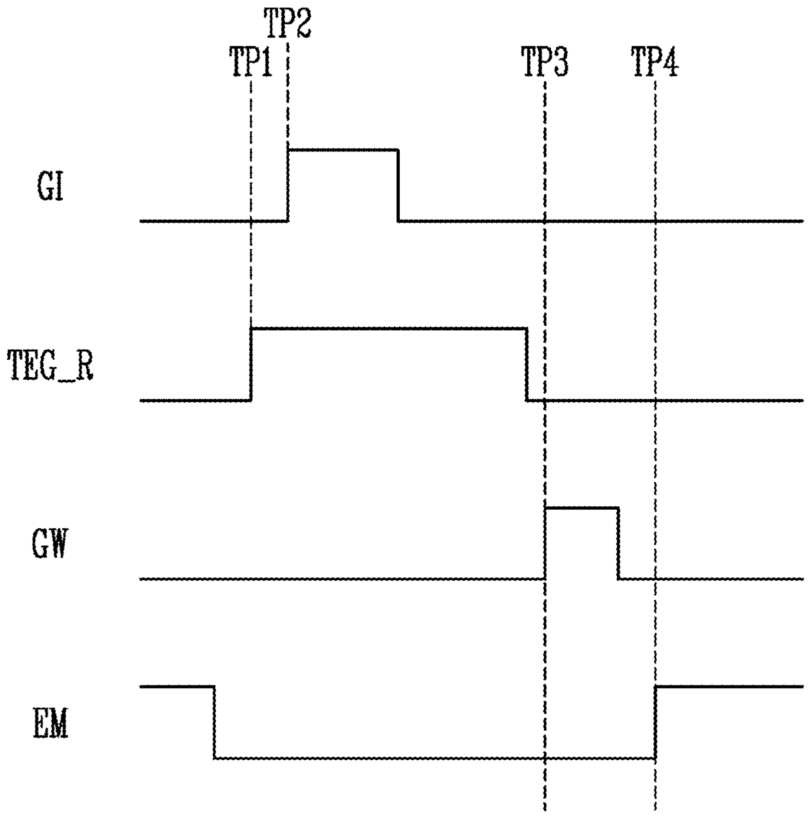
FIG. 7 is a timing diagram for describing the operation of the pixel of FIG. 5 and the bias voltage generator of FIG. 6.

FIG. 7 is a timing diagram for describing the operation of the pixel PXij of FIG. 5 and the bias voltage generator 16 of FIG. 6.

Referring to FIGS. 1, and 5 to 7, the emission driver 15 may supply an emission control signal EM having a low voltage (or second voltage level) to the pixel PXij. In other words, a disable emission control signal may be applied. A period in which the disable emission control signal is applied may be referred to as a non-emission period (or first period). In this case, the third transistor T3 may be turned off in response to the disable emission control signal, thereby causing the light emitting element LD not to emit light.

At a first time point TP1 in the non-emission period, the timing controller 11 may provide a switching control signal TEG_R having a high voltage (or a first voltage level) to the bias voltage generator 16. The bias voltage generator 16 may provide a bias voltage V_BULK to the pixel PXij in response to the switching control signal TEG_R. In this case, the resistance component of the first diode D1 may be adjusted by the bias voltage V_BULK, and the subthreshold swing of the first transistor T1 may be adjusted.

At a second time point TP2 in the non-emission period, the scan driver 13 may provide a first enable scan signal GI having a high voltage to the pixel PXij. In this case, the fourth transistor T4 is turned on in response to the first enable scan signal GI, and the voltage of the initialization power Vint may be supplied to the first electrode of the light emitting element LD. Here, a parasitic capacitor included in the light emitting element LD may be discharged, thereby enhancing black expression performance.

At a third time point TP3 in the non-emission period, the scan driver 13 may provide a second enable scan signal GW having a high voltage to the pixel PXij. In this case, the second transistor T2 may be turned on in response to the second enable scan signal GW, a data signal VDATA (or a data voltage) may be supplied from the data line DLj to the fourth node N4, and the data signal VDATA may be stored in the storage capacitor Cst.

At a fourth time point TP4 after the non-emission period, the emission driver 15 may supply an emission control signal EM having a high voltage to the pixel PXij. In this case, the third transistor T3 may be turned on in response to the emission control signal EM, and current may be supplied from the first transistor T1 to the light emitting element LD, thereby enabling the light emitting element LD to emit light with a certain luminance. Here, the current may correspond to the data signal VDATA stored in the storage capacitor Cst.

In an embodiment, the switching control signal TEG_R may periodically have a high level. For example, with respect to the pixel PXij, the timing controller 11 may provide the switching control signal TEG_R with a high voltage in each non-emission period (or on a frame period cycle).

The display device 10 of FIG. 1 may be used as a display screen for various products such as not only portable electronic devices such as mobile phones, smartphones, tablet personal computers (PCs), mobile communication terminals, electronic notebooks, e-books, portable multimedia players (PMPs), navigations, and ultra mobile PCs (UMPCs), but also televisions (TVs), laptops, monitors, billboards, Internet of Things (IoT), or the like. According to an embodiment, the display device 10 may also be used in wearable devices such as smart watches, watch phones, glasses-type displays, or head mounted displays (HMDs). According to an embodiment, the display apparatus may also be used in dashboards of vehicles, center information displays (CIDs) of the center fascia or dashboards of vehicles, mirror displays that replace the side view mirrors of vehicles, and display screens arranged on the rear sides of front seats to serve as entertainment devices for back seat passengers of vehicles.

A display device according to an embodiment is applicable to various types of electronic devices. In an embodiment, an electronic device includes the above-described display device and may further include other modules or devices having additional functions in addition to the display device.

Figure 8:
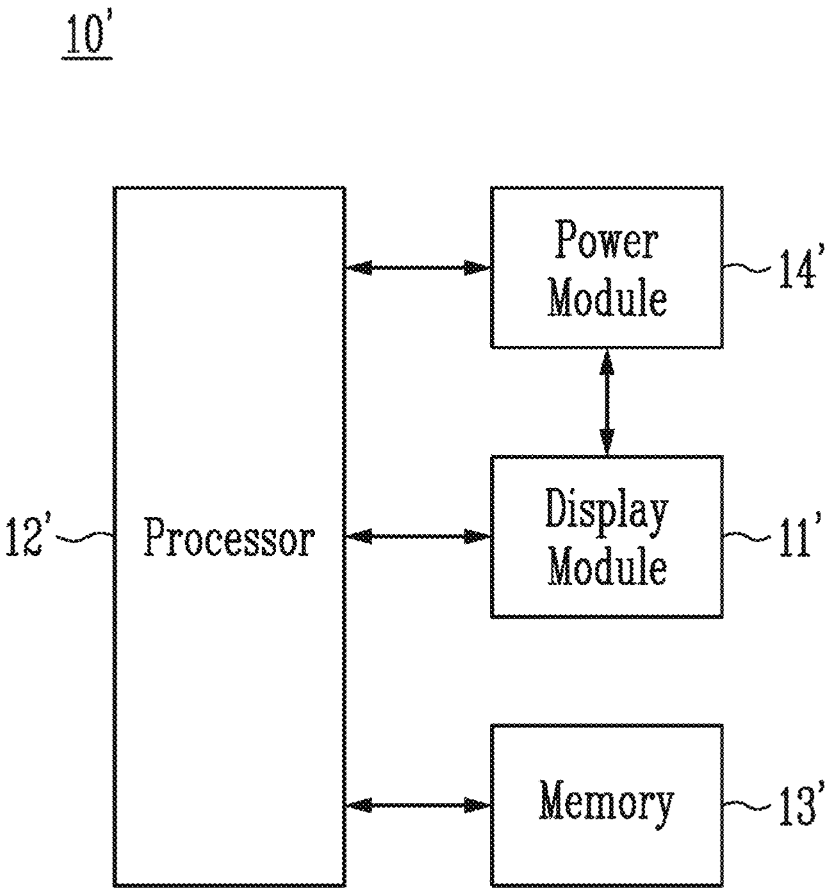
FIG. 8 is a block diagram of an electronic device according to an embodiment.

FIG. 8 is a block diagram of an electronic device according to an embodiment. Referring to FIG. 8, the electronic device 10' may include a display module 11', a processor 12', a memory 13', and a power module 14'.

The processor 12' may include at least one of a central processing unit (CPU), an application processor (AP), a graphic processing unit (GPU), a communication processor (CP), an image signal processor (ISP), and a controller.

The memory 13' may store data and/or information used to operate the processor 12' or the display module 11'. When the processor 12' executes an application stored in the memory 13', image data signals and/or input control signals may be transferred to the display module 11'. The display module 11' may process the provided signals and output image information on a display screen.

The power module 14' may include a power supply module, such as a power adapter or a battery device, and a power conversion module. The power conversion module converts power supplied by the power supply module and generates power to operate the electronic device 10'.

At least one of the above-described components of the electronic device 10' may be included in the display device according to embodiments as described above. In addition, in terms of functionality, some of the individual modules included in one module may be included in the display device and others may be provided separately from the display device. For example, the display module 11' is included in the display device, whereas the processor 12' , the memory 13' , and the power module 14' are not included in the display device and are instead provided separately in the electronic device 10' .

Figure 9:
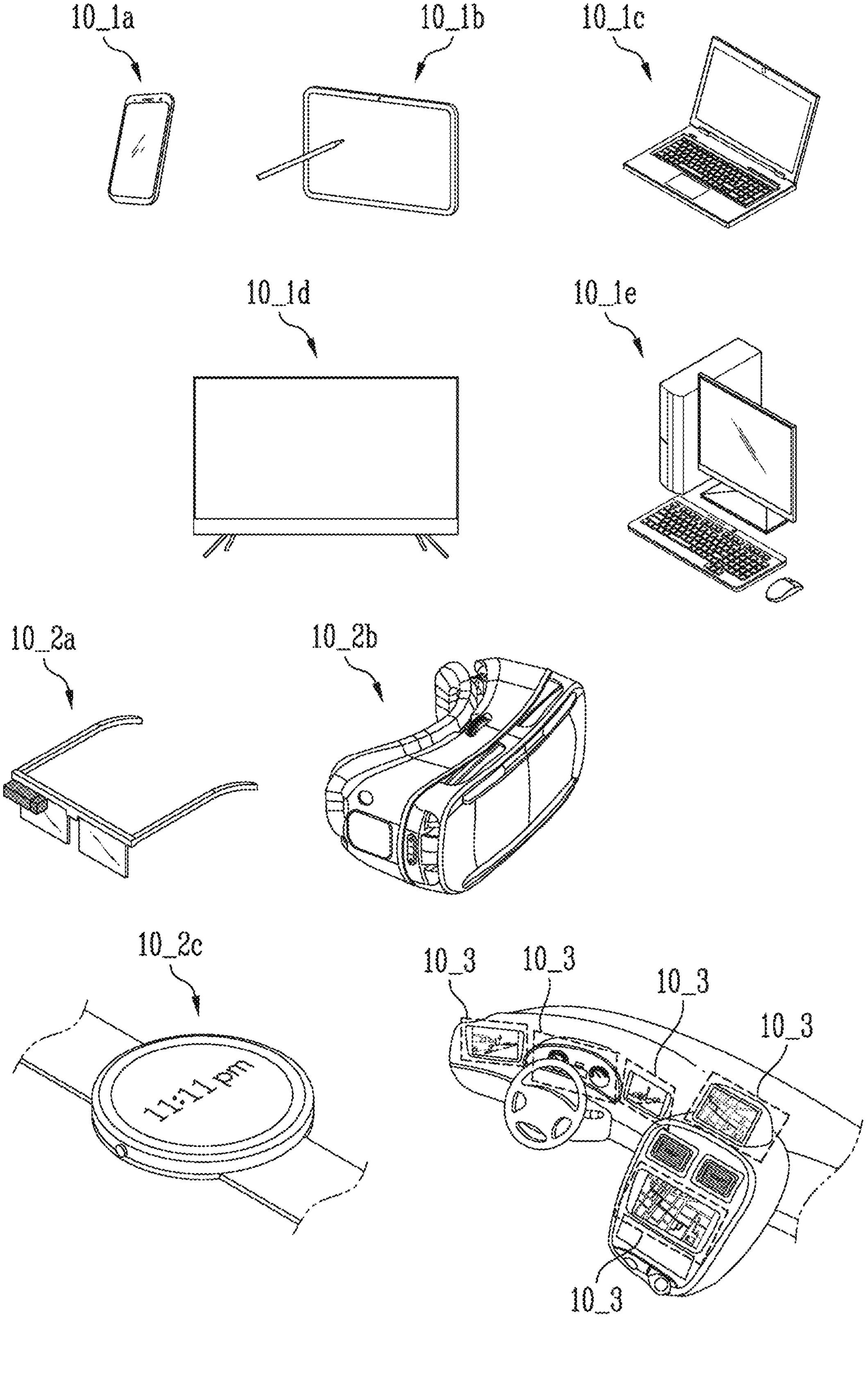
FIG. 9 shows schematic views of various embodiments of an electronic device.

FIG. 9 shows schematic views of various embodiments of an electronic device.

Referring to FIG. 9, various types of electronic devices to which embodiments of a display device are applied may include an electronic device to display images such as a smartphone 10_1$a$, a tablet PC 10_1$b$, a laptop computer 10_1$c$, a television (TV) 10_1$d$, and a desktop monitor 10_1$e$, a wearable electronic device including a display module such as smart glasses 10_2$a$, a head-mounted display (HMD) 10_2$b$, and a smart watch 10_2$c$, and an automotive electronic device 10_3 including a display module such as a center information display (CID) disposed at the instrument cluster, the center fascia, and the dashboard of a vehicle, and a room mirror display.

While the spirit and scope of the present disclosure are described by exemplary embodiments, it should be noted that the above-described embodiments are descriptive and should not be considered limiting. It should be understood by those skilled in the art that various changes, substitutions, and alternations may be made herein without departing from the scope of the disclosure as defined by the following claims.

What is claimed is:

1. A pixel comprising:

a light emitting element electrically connected between a first node and a second power line;

a pixel circuit electrically connected between a second node and the first node, and including a first transistor configured to control current flowing from the second node to the first node in response to a data signal; and a transistor electrically connected between a first power line and the first transistor, and including a gate electrode electrically connected to the first power line, wherein the transistor further includes a lower electrode disposed opposite the gate electrode with an active layer of the transistor interposed therebetween, the lower electrode being configured to receive a bias voltage.

2. The pixel according to claim 1, wherein each of the transistor and the first transistor includes an oxide semiconductor.

3. The pixel according to claim 1, wherein a subthreshold swing representing a relationship between the data signal and the current varies depending on the bias voltage.

4. The pixel according to claim 3, wherein, as the bias voltage increases, a voltage range of the data signal for expressing a specific grayscale range increases.

5. The pixel according to claim 1, wherein:

the first transistor is electrically connected between the second node and a third node, and a gate electrode of the first transistor is electrically connected to a fourth node, and the pixel circuit further comprises:

a second transistor electrically connected between the fourth node and a data line to which the data signal is applied;

a capacitor electrically connected between the fourth node and the third node;

a third transistor electrically connected between the third node and the first node; and a fourth transistor electrically connected between the first node and a third power line.

6. The pixel according to claim 5, wherein each of the transistor and the first to fourth transistors includes an oxide semiconductor.

7. The pixel according to claim 5, wherein the second to fourth transistors include no lower electrode.

8. A display device, comprising:

a display panel including a pixel;

a data driver configured to supply a data signal to the display panel; and a bias voltage generator configured to provide a bias voltage to the display panel, wherein the pixel comprises:

a light emitting element electrically connected between a first node and a second power line;

a pixel circuit electrically connected between a second node and the first node, and including a first transistor configured to control current flowing from the second node to the first node in response to the data signal; and a transistor electrically connected between a first power line and the first transistor, and including a gate electrode electrically connected to the first power line, and wherein the transistor further includes a lower electrode disposed opposite the gate electrode with an active layer of the transistor interposed therebetween, the lower electrode being configured to receive the bias voltage.

9. The display device according to claim 8, wherein the bias voltage generator is disposed outside the display panel.

10. The display device according to claim 8, wherein the bias voltage generator comprises:

an amplifier;

a switching transistor electrically connected between a reference power line and a first input terminal of the amplifier; and a voltage divider configured to divide a voltage outputted through an output terminal of the amplifier and output the divided voltage through an output end of the bias voltage generator.

11. The display device according to claim 10, wherein the voltage divider comprises:

a plurality of first resistors connected in series between the output terminal of the amplifier and the output end of the bias voltage generator;

a plurality of switching transistors respectively connected in parallel to the first resistors; and a second resistor electrically connected between the output end of the bias voltage generator and a ground.

12. The display device according to claim 10, wherein:

the first transistor is electrically connected between the second node and a third node, and a gate electrode of the first transistor is electrically connected to a fourth node, the pixel circuit further comprises:

a second transistor electrically connected between the fourth node and a data line to which the data signal is applied;

a capacitor electrically connected between the fourth node and the third node;

a third transistor electrically connected between the third node and the first node; and a fourth transistor electrically connected between the first node and a third power line.

13. The display device according to claim 12, further comprising:

a timing controller configured to provide image data to the data driver;

a scan driver configured to provide a second scan signal to the second transistor and provide a first scan signal to the fourth transistor; and an emission driver configured to provide an emission control signal to the third transistor, and wherein the timing controller supplies a switching control signal to the switching transistor.

14. The display device according to claim 13, wherein the timing controller periodically provides the switching control signal having a first voltage level.

15. The display device according to claim 13, wherein:

in a first period, the emission driver provides the emission control signal of a second voltage level, at a first time point in the first period, the timing controller provides a switching control signal of a first voltage level, at a second time point in the first period, the scan driver provides a first scan signal of a first voltage level, and at a third time point in the first period, the scan driver provides a second scan signal of a first voltage level.

16. The display device according to claim 8, wherein the bias voltage generator provides the bias voltage in common to all pixels in the display panel.

17. The display device according to claim 8, wherein the bias voltage generator sequentially provides the bias voltage according to a scanning order.

18. The display device according to claim 8, wherein each of the transistor and the first transistor includes an oxide semiconductor.

19. The display device according to claim 8, wherein a subthreshold swing representing a relationship between the data signal and the current varies depending on the bias voltage, and wherein, as the bias voltage increases, a voltage range of the data signal for expressing a specific grayscale range increases.

20. An electronic device, comprising:

a display panel including a pixel;

a driver configured to supply a data signal to the display panel based on input image data;

a processor to provide input image data to the driver; and a bias voltage generator configured to provide a bias voltage to the display panel, wherein the pixel comprises:

a light emitting element electrically connected between a first node and a second power line;

a pixel circuit electrically connected between a second node and the first node, and including a first transistor configured to control current flowing from the second node to the first node in response to the data signal; and a transistor electrically connected between a first power line and the first transistor, and including a gate electrode electrically connected to the first power line, and wherein the transistor further includes a lower electrode disposed opposite the gate electrode with an active layer of the transistor interposed therebetween, the lower electrode being configured to receive the bias voltage.

* * * * *